(12) United States Patent
Morris

(10) Patent No.: US 6,427,707 B1
(45) Date of Patent: Aug. 6, 2002

(54) MOBILE SUPERMARKET TROLLEY WASHER

(75) Inventor: Robert John Morris, Minchinbury (AU)

(73) Assignee: Sabaci Pty Limited, New South Wales (AU)

(*) Notice: Subject to any disclaimer, the term of this patent is extended or adjusted under 35 U.S.C. 154(b) by 0 days.

(21) Appl. No.: 09/640,310

(22) Filed: Aug. 16, 2000

(51) Int. Cl.[7] ................................................ B08B 3/02
(52) U.S. Cl. .................. 134/72; 134/111; 134/123; 134/131
(58) Field of Search ................. 134/45, 123, 124, 134/130, 72, 82, 111, 131, 133, 140, 147, 151, 165, 182

(56) References Cited

U.S. PATENT DOCUMENTS

| | | | | |
|---|---|---|---|---|
| 2,974,672 A | * | 3/1961 | Fox | |
| 2,981,266 A | | 4/1961 | Tamburri | ............. 134/72 |
| 2,997,048 A | * | 8/1961 | Gertken et al. | |
| 3,022,791 A | * | 2/1962 | Larson | |
| 3,096,775 A | * | 7/1963 | Clarke et al. | |
| 3,179,117 A | * | 4/1965 | Ginson et al. | |
| 3,258,019 A | * | 6/1966 | Bellas et al. | |
| 3,289,238 A | * | 12/1966 | Sorenson et al. | |
| 3,444,867 A | * | 5/1969 | Thornton | |
| 3,698,029 A | * | 10/1972 | Pulliam | |
| 4,279,263 A | * | 7/1981 | Pulliam | |
| 4,807,319 A | * | 2/1989 | Poitevin | |
| 5,133,375 A | * | 7/1992 | Schinzing et al. | |
| 5,285,802 A | * | 2/1994 | Soderquist | |
| 5,299,585 A | * | 4/1994 | Dall'oglio | |
| 5,597,001 A | * | 1/1997 | Rasmussen et al. | |
| 5,993,739 A | * | 11/1999 | Lyon | |
| 6,090,218 A | * | 7/2000 | Brackmann et al. | |
| 6,244,278 B1 | * | 6/2001 | Rasmussen | |

* cited by examiner

*Primary Examiner*—Frankie L. Stinson
(74) *Attorney, Agent, or Firm*—Ladas & Parry

(57) ABSTRACT

A mobile supermarket trolley washing apparatus including an enclosure through which the trolleys pass. Spray nozzles deliver a liquid stream to the trolleys within the enclosure to clean the trolleys.

7 Claims, 2 Drawing Sheets

MOBILE SUPERMARKET TROLLEY WASHER

FIELD OF THE INVENTION

Supermarket trolleys, if cleaned at all, are cleaned manually with detergent and water. In some larger supermarkets, the expense associated with the washing of trolleys can be excessive due to the time involved in the manual operation and the wages which must be paid to the washing personnel.

OBJECT OF THE INVENTION

It is the object of the present invention to provide a convenient means by which supermarket trolleys can be washed en mass.

DISCLOSURE OF THE INVENTION

There is disclosed herein a mobile supermarket trolley washing apparatus for simultaneously washing a plurality of trolleys, said apparatus comprising: a chassis; an enclosure to contain the plurality of trolleys, said enclosure having first and second ends and being mounted on the chassis and into which said trolleys are delivered from either the first or second end to be cleaned, an opening at each of said ends through which said trolleys enter or leave said enclosure; a conveyor mounted on said chassis and extending through said enclosure, the conveyor being adapted to receive said trolleys to move the trolleys in either direction between said first and second ends; a plurality of liquid spray nozzles mounted to direct liquid spray at the interior of said enclosure to clean said trolleys being conveyed; an assembly to deliver an air curtain across each said opening such that said trolleys are dried; and means for recycling said sprayed liquid from said enclosure back to said nozzles.

BRIEF DESCRIPTION OF THE DRAWINGS

Preferred forms of the present invention will now be described by way of example with reference to the accompanying drawings wherein.

DESCRIPTION OF THE PREFERRED EMBODIMENT

Figure 1:
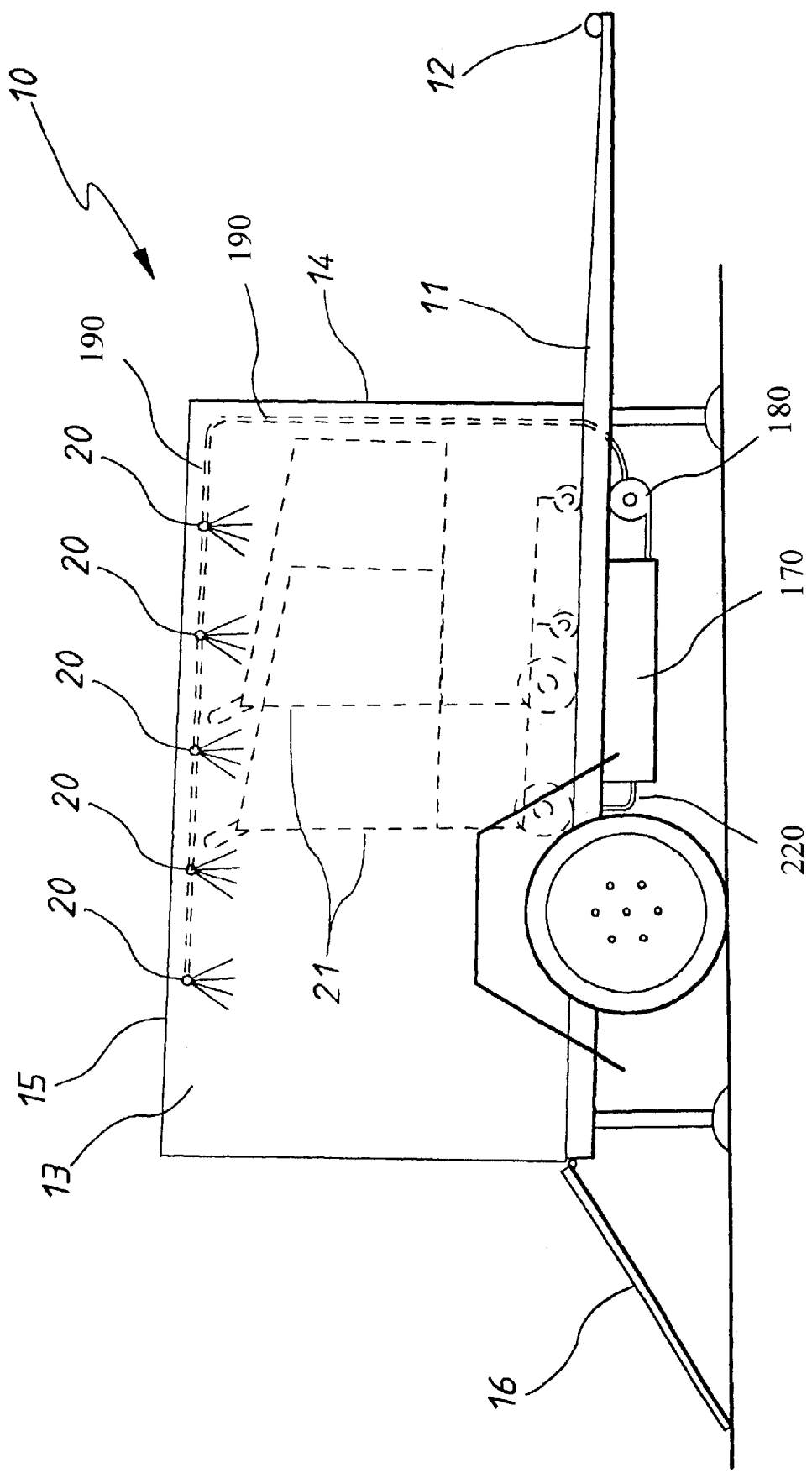
FIG. 1 is a schematic side elevation of a mobile supermarket trolley wash unit.

In FIG. 1 of the accompanying drawings there is schematically depicted a mobile supermarket trolley washing unit 10. Unit 10 is in the form of a trailer including a chassis 11 having a towing hitch 12 at its forward extremity. Unit 10 may be drawn behind a motor vehicle, a truck or a tractor for example. The chassis 11 supports an enclosed washing space defined by a pair of side walls 13, a front wall 14, a roof 15 and a rear wall 16 which is shown in a down-folded configuration providing an on/off ramp in the drawing. A tank 170 is attached to the chassis 11 and is adapted to store a mixture of water and a biodegradable detergent. The detergent might be of the type known as TURCO PLAUDIT F as provided by Elf Atochem. It is a multi-purpose, non perfumed liquid cleaner which can be diluted to forty parts of water. However, it should be appreciated that many other different types of detergent can be used. Associated with the storage tank 170 is a pump 180 which might be an electric pump driven by a battery. Pump 180 delivers liquid via tube 190 to two arrays of liquid nozzles 20. Each array of nozzles 20 would be situated at one lateral side of the enclosed space defined by the walls of the cleaning unit.

Typically, each array of nozzles 20 is situated so as to direct a stream of diluted detergent at shopping trolleys 21, laterally from one side thereof. That is, each array generally faces the other so as to spray the trolleys 21 therebetween. Alternatively, the nozzles 20 might be situated above and to the side of the trolleys and directed downwardly at an angle thereat.

The floor of the washing unit can include a tarp or other waterproof catchment means by which the over sprayed water and detergent is caught and returned via line 220 to the storage tank 170.

Typically, each sidewall 13 is about 5.5 meters in length so as to accommodate the number of interengaged or stacked trolleys. Also, the floor of the unit is to be sufficiently wide to receive two trolleys side-by-side. The walls of the washing unit might typically be fabricated from aluminium sheet or other solid material. In an alternative arrangement, where the washing unit were constructed from a non-purpose built trailer, the walls thereof could have a waterproof membrane affixed thereto, which membrane might also extend across the floor of the trailer. Such a membrane would be adapted to prevent over sprayed washing liquid from permeating into the car park space and thus contaminating parked motor vehicles.

The unit might also include a grate at the upper edge of ramp 16 to prevent water from flowing down the ramp. Furthermore, plastic flaps could depend from the upper edge of the roof 15 down to the floor to prevent over spray. Similarly, plastic flaps might depend from the forward edge of the roof 15 and down to the floor of the unit. A grate might be provided at the floor at the vicinity of such plastic flaps for the purpose of water recirculation.

A walk platform might surround the enclosed space which receives the shopping trolleys which would serve the purpose of enabling access by an operator to inspect the operation of the unit. This might be particularly beneficial if the washing unit included no roof.

It should be appreciated that modifications and alterations obvious to those skilled in the art are not to be considered as beyond the scope of the present invention. For example the water sprays 20 could be situated at the floor of the enclosed space and could be directed upwardly at the trolleys.

In an embodiment including no roof, if it were desirable to clean particularly stubborn dirt or grime from a trolley, an operator walking upon the exterior walking platform could direct a manual pressure washer over the walls of the unit at the trolley in question.

Figure 2:
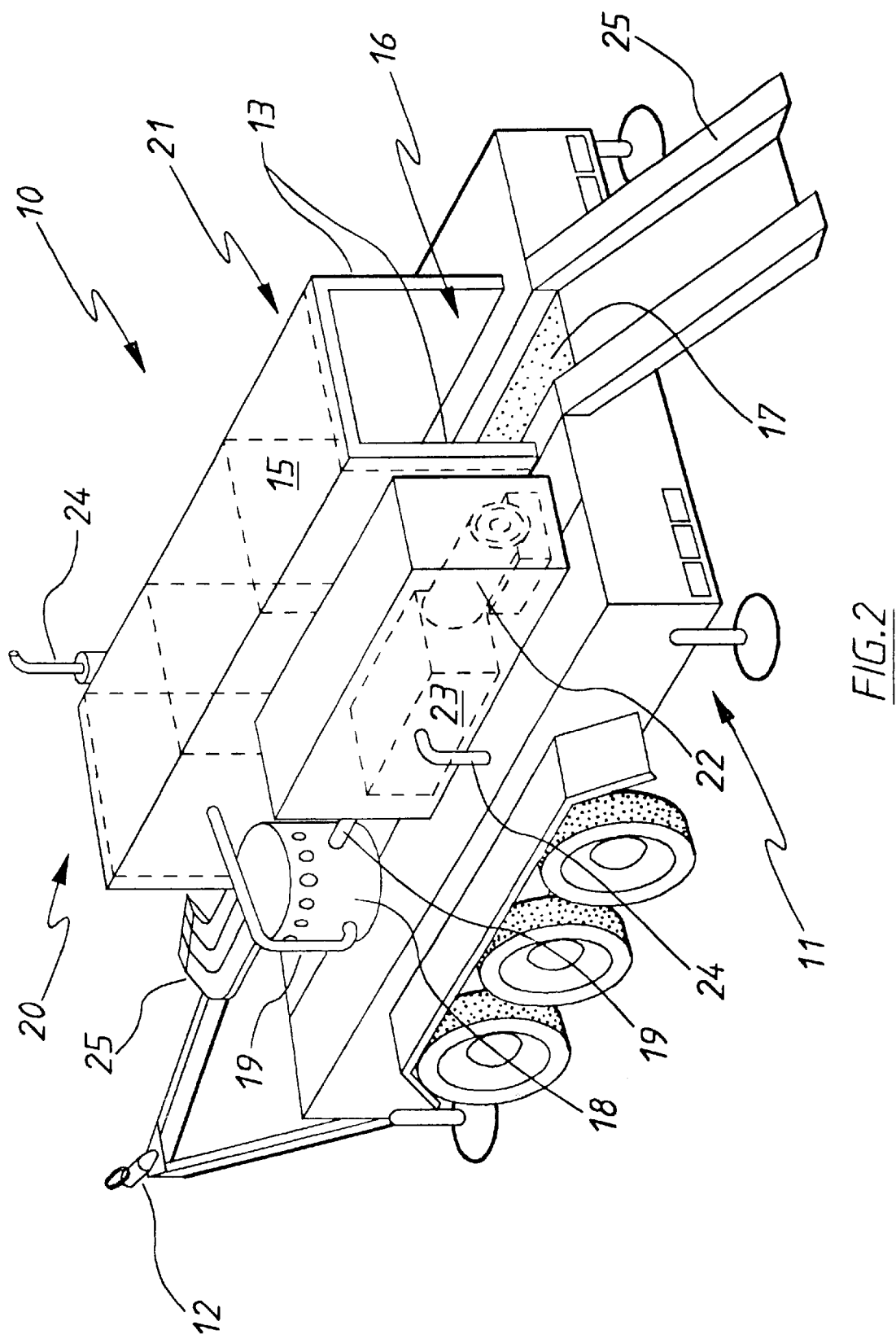
FIG. 2 is a schematic modification of the mobile supermarket trolley wash unit of FIG. 1.

In the embodiment of FIG. 2 the unit 10 has the sidewalls 13 and roof 11 defining a tunnel 16 along which the trolleys are conveyed by means of a drivers conveyor 17.

Also mounted on the chassis 11 is a "blower" assembly 18 which via ducting 19 delivers to the front 20 and rear 21 of the tunnel 16 air at raised pressure in order to recreate an air curtain. The air curtain aids to maintain water within the tunnel 11.

Also mounted on the chassis 11 is a generator/pump, with the pump aspect thereof delivering water under pressure to the nozzles 20. The generator/pump 22 is driven by means of a motor 23 having an exhaust 24. The generator provides electric energy for the purposes of driving the blower 18 and motors which drive the conveyor 17.

In operation of the unit 10, trolleys are driven to through the tunnel 16 so that they are subjected to water exiting from the nozzles 20. In this respect it should be appreciated that the conveyor 17 may be driven in either direction.

To aid in delivering and removing trolleys from the conveyor 17 there is provided ramps 25.

The claims defining the invention are as follows:

1. A mobile supermarket trolley washing apparatus for simultaneously washing a plurality of trolleys, said apparatus comprising:

a chassis;

an enclosure to contain the plurality of trolleys, said enclosure having first and second ends and being mounted on the chassis and into which said trolleys are delivered from either the first or second end to be cleaned, an opening at each of said ends through which said trolleys enter or leave said enclosure;

a conveyor mounted on said chassis and extending through said enclosure, the conveyor being adapted to receive said trolleys to move the trolleys in either direction between said first and second ends;

a plurality of liquid spray nozzles mounted to direct liquid spray at the interior of said enclosure to clean said trolleys being conveyed;

an assembly to deliver an air curtain across each said opening such that said trolleys are dried; and means for recycling said sprayed liquid from said enclosure back to said nozzles.

2. The washing apparatus of claim 1 further including a pump mounted on said chassis and connected to said nozzles to deliver said liquid under pressure thereto.

3. The washing apparatus of claim 1 further including ramp means to facilitate transportation of the trolleys with respect to said enclosure.

4. The washing apparatus of claim 1, wherein said conveyor is integral with said chassis.

5. The washing apparatus of claim 1, wherein means for recycling comprises a reservoir that is integral with said chassis.

6. A combination comprising the washing apparatus of claim 1 and a plurality of trolleys disposed within the enclosure.

7. The combination of claim 6, wherein the trolleys are disposed in the enclosure side-by-side.

\* \* \* \* \*